United States Patent
Loisel et al.

(10) Patent No.: US 11,443,071 B2
(45) Date of Patent: Sep. 13, 2022

(54) SECURE DEBUG ARCHITECTURE

(71) Applicant: SiFive, Inc., San Mateo, CA (US)

(72) Inventors: Yann Loisel, La Ciothe (FR); Frank Lhermet, Auriol (FR)

(73) Assignee: SiFive, Inc., San Mateo, CA (US)

( * ) Notice: Subject to any disclaimer, the term of this patent is extended or adjusted under 35 U.S.C. 154(b) by 17 days.

(21) Appl. No.: 16/790,222

(22) Filed: Feb. 13, 2020

(65) Prior Publication Data
US 2021/0256164 A1 Aug. 19, 2021

(51) Int. Cl.
*G06F 21/72* (2013.01)
*G06F 21/57* (2013.01)
*G06F 21/73* (2013.01)
*H04L 9/06* (2006.01)
*H04L 9/08* (2006.01)
*H04L 9/32* (2006.01)
(Continued)

(52) U.S. Cl.
CPC ......... *G06F 21/72* (2013.01); *G01R 31/3177* (2013.01); *G01R 31/31705* (2013.01); *G01R 31/31713* (2013.01); *G06F 21/572* (2013.01); *G06F 21/73* (2013.01); *H04L 9/0662* (2013.01); *H04L 9/0819* (2013.01); *H04L 9/0869* (2013.01); *H04L 9/3226* (2013.01); *G06F 2221/033* (2013.01)

(58) Field of Classification Search
None
See application file for complete search history.

(56) References Cited

U.S. PATENT DOCUMENTS 8,423,789 B1 * 4/2013 Poo .................. H04L 9/0822
713/189
9,832,303 B2 * 11/2017 LaMotte ............ G06F 11/22
(Continued)

FOREIGN PATENT DOCUMENTS

WO WO-2007041356 A1 * 4/2007 ............... H04L 9/32
WO 2010088043 A2 8/2010

OTHER PUBLICATIONS

Amitabh Das, et al.. "Secure JTAG Implementation Using Schnorr Protocol"; Journal of Electronic Testing, Springer Verlag, 2013, 29 (2), pp. 193-209.
(Continued)

*Primary Examiner* — Michael Pyzocha
(74) *Attorney, Agent, or Firm* — Young Basile Hanlon & MacFarlane, P.C.

(57) ABSTRACT

Systems and methods are disclosed for secure debug architecture. For example, an integrated circuit (e.g., a processor) for executing instructions includes a processor core configured to execute instructions; a debug interface comprising two or more conductors with input/output drivers configured to, when enabled, transmit and receive signals between the processor core and an external host device via the two or more conductors; and wherein the integrated circuit is configured to: receive a request from a host device for access to the integrated circuit via the debug interface; responsive to the request, generate a random number; transmit the random number from the integrated circuit to the host device via the debug interface; receive, from the host device via the debug interface, input data that has been encrypted using the random number as a key; and decrypt the input data using the random number as a key.

23 Claims, 14 Drawing Sheets

(51) Int. Cl.
*G01R 31/317* (2006.01)
*G01R 31/3177* (2006.01)

(56) References Cited

U.S. PATENT DOCUMENTS

| | | | | |
|---|---|---|---|---|
| 2004/0255199 | A1* | 12/2004 | Yamashita | G06F 21/629 |
| | | | | 714/37 |
| 2005/0289397 | A1* | 12/2005 | Haruki | G06F 11/3648 |
| | | | | 714/38.1 |
| 2007/0043978 | A1 | 2/2007 | Cruzado et al. | |
| 2007/0162759 | A1 | 7/2007 | Buskey et al. | |
| 2008/0282087 | A1* | 11/2008 | Stollon | G01R 31/31719 |
| | | | | 713/171 |
| 2009/0307546 | A1* | 12/2009 | Dunn | G01R 31/31719 |
| | | | | 713/182 |
| 2010/0263043 | A1* | 10/2010 | Xu | G06F 21/85 |
| | | | | 726/17 |
| 2010/0303239 | A1* | 12/2010 | James | H04L 9/0894 |
| | | | | 380/277 |
| 2011/0066835 | A1* | 3/2011 | Kothari | G06F 11/3648 |
| | | | | 713/2 |
| 2011/0246707 | A1* | 10/2011 | Ito | G06F 12/0246 |
| | | | | 711/103 |
| 2015/0113594 | A1* | 4/2015 | Stewart | G06F 21/53 |
| | | | | 726/3 |
| 2015/0242606 | A1* | 8/2015 | Shin | G01R 31/318588 |
| | | | | 713/182 |
| 2016/0139201 | A1* | 5/2016 | Lin | G06F 11/2236 |
| | | | | 714/727 |
| 2017/0089477 | A1* | 3/2017 | Svensson | F16K 27/044 |
| 2017/0090909 | A1* | 3/2017 | Guo | G06F 21/57 |
| 2017/0139008 | A1* | 5/2017 | Lim | G01R 31/318588 |
| 2017/0168910 | A1* | 6/2017 | Kim | G06F 11/079 |
| 2019/0042712 | A1* | 2/2019 | Loisel | G06F 21/14 |
| 2019/0097785 | A1* | 3/2019 | Elenes | H04L 9/002 |
| 2019/0303268 | A1* | 10/2019 | Ansari | G06F 11/2236 |
| 2019/0347401 | A1* | 11/2019 | Chen | G06F 21/554 |
| 2019/0361073 | A1* | 11/2019 | Trantham | G01R 31/31705 |
| 2020/0019734 | A1* | 1/2020 | Raja Gopal | G06F 21/12 |
| 2020/0348361 | A1* | 11/2020 | Kurts | H04L 9/0631 |

OTHER PUBLICATIONS

Valea Emanuele et al.. "Encryption-Based Secure JTAGI"; 2019 IEEE 22nd International Symposium on Design and Diagnostics of Electronic Circuits & Systmes (DDECS), IEEE, Apr. 24, 2019, pp. 1-6.

International search report for application No. PCT/US2021/017922, dated May 25, 2021. 10 pages.

* cited by examiner

US 11,443,071 B2

SECURE DEBUG ARCHITECTURE

TECHNICAL FIELD

This disclosure relates to secure debug architecture.

BACKGROUND

Integrated circuits for executing instructions (e.g., processors or microcontrollers) often include a debug port that enables a host device (e.g., a personal computer or laptop) to communicate with each other via a set of conductors (e.g., providing a serial port). For example, a host device may connect to the debug interface of an integrated circuit using a debug probe (e.g., a Joint Test Action Group (JTAG) probe). For example, the debug interface may be used by a host device to write input data (e.g., firmware images and/or debug commands) to the integrated circuit and read output data (e.g., register values or other memory contents) from the integrated circuit.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
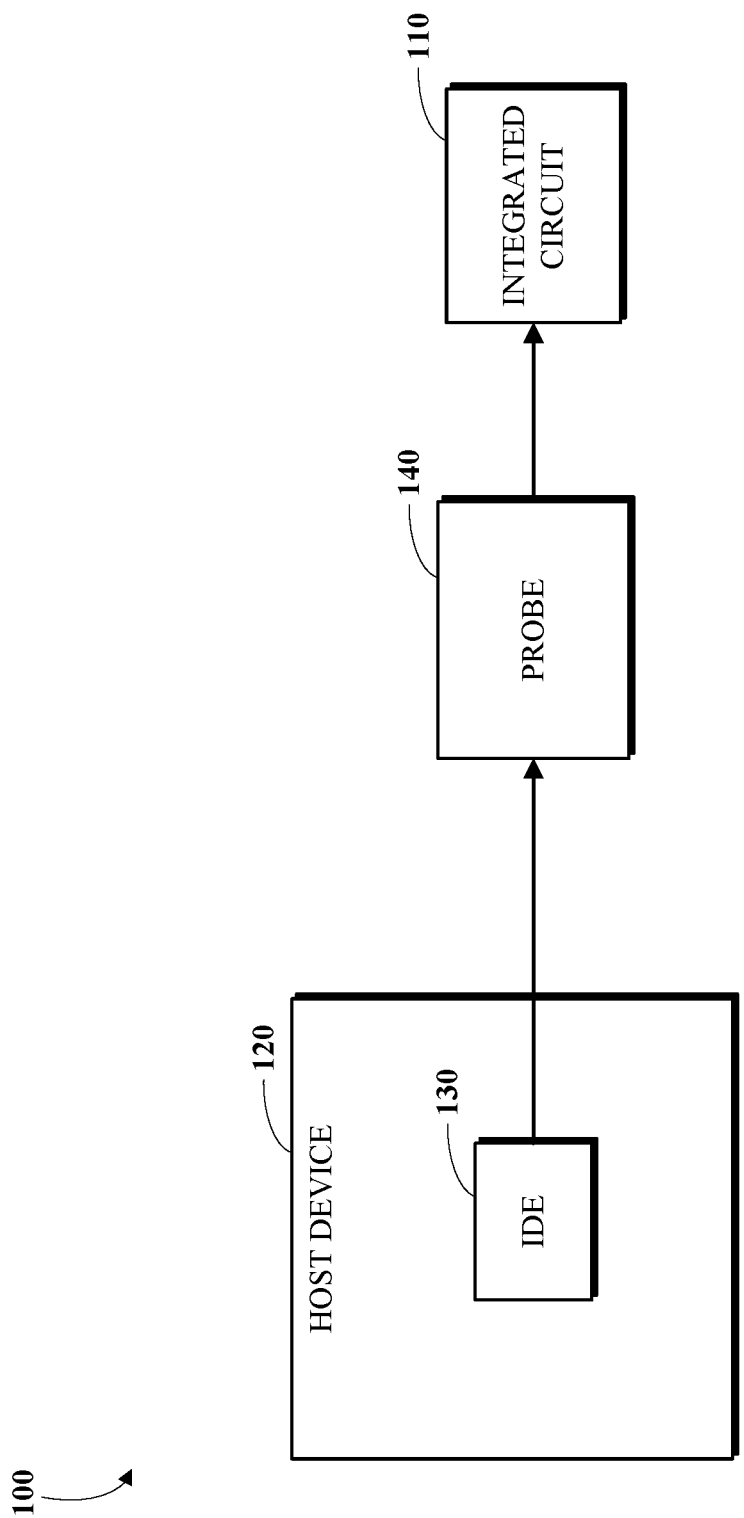
FIG. 1 is a block diagram of an example of a system for debugging an integrated circuit for executing instructions.

Systems and methods are described herein that may be used to implement a secure debug architecture. Controlling and restricting the debug conditions may provide a high level of confidence in the access to the firmware development. Secure protocols are proposed herein to control the core debug using the chip debug interface between a host device (e.g., a personal computer) and an integrated circuit (e.g., a chip) via a probe (e.g., a JTAG probe). In some implementations these protocols are mandatory to enable communication on the debug interface. In some implementations, these secure debug proposals benefit from the availability of the Secure Startup firmware on the integrated circuit, which may include cryptographic and keys management routines; TRNG access (optional), and access to authentication circuit and debug circuit registers. For example, some of these protocols may use authentication with a public key pair and encryption (optional). In some implementations, a probe initially sends a magic sequence (e.g., a customer chi identifier (CCID)) to the debug circuit to inform the integrated circuit about a debug session opening request. The CCID could be a secret or non-secret, only an identification value. Once the identification is performed, the firmware running on the integrated circuit may be enabled to manage the communication. If the authentication is successful, the debug mechanism may be enabled.

In an example use case, a user wishes to start a debug session. Pre-requisite: the integrated circuit has the secure debug interface implemented. Data preparation: the data to be transferred may be prepared off-line. In some implementations, a signing key, may be used to sign data input to the integrated circuit. For example, data may be signed using a tool connected to the ECDSA running on a host device operated by the user. For example, the signed data may include customized data for the integrated circuit, such as a P/N and/or S/N for better integrated circuit targeting. For example, the data and their signature can be stored within the probe or stay on the host device. This data is usually not sensitive as it usually does not contain any secret value.

For example, secure activation for debug may proceed as follows: 1. the integrated circuit may be started, and the debug signal may be kept disabled (but not locked). 2. the CCID identification pattern may be sent by the probe to the integrated circuit. 3. the debug module may transfer the CCID to an authentication module of the integrated circuit. 4. the authentication module sets the CCID-ok flag if the CCID is ok, otherwise lock the debug interface enable signal in disabled state and exit. 5. the authentication module may then reset a processor core of the integrated circuit. 6. A Secure Startup code (e.g., firmware) detects the CCID-ok flag and starts a secure debug routine. 7. the Secure Startup performs the host authentication process and validates the signed data. 8. if successful, the Secure Startup informs the authentication module. 9. the authentication module instructs the debug module to enable the debug interface and its connection to the processor core.

For example, a dynamic protocol may be used to establish a secure debug communication session between a host device and the integrated circuit. Using a dynamic protocol may provide security against listen and repeat attacks. In some implementations, a dynamic protocol includes: 1. the CCID and public keypairs CSK, (for signed data, . . . ) and DPK, for dynamic authentication; a. the DPK and CSK public key values are stored in non-volatile memory of the integrated circuit. b. the DPK private key value may be either in the host or could be in the probe. 2. the integrated circuit may perform a random number generation and send this random number, encrypted with DPK (public key, using either RSA-ES or ECIES), to the host device. 3. the host device may decrypt the received data using a DPK private key held y the host device and extract the random number generated by the integrated circuit. 4. the host device may encrypt the signed data with an AES algorithm using the random number as an encryption key. 5. the integrated circuit may decrypt the encrypted data using the random number as a key and check the signed data. 6. the integrated circuit may interpret the data and determine which action is to be taken. This exchange is dynamic because of the random number, so a replay attack may be prevented or discouraged.

In some implementations of these secure debug proposals a debug probe plays a role. It may be desirable to "hide" the secure debug protocol as much as possible from the host device, and thus have a most or all sensitive data stored within the probe. For example, the sensitive data for storage in the probe may include, the signed data, the DPK, the code for decryption/encryption, a certain level of security for protecting the DPK, a way to upload the DPK, and a way to revoke the DPK.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is a block diagram of an example of a system 100 for debugging an integrated circuit 110 for executing instructions. The system 100 include the integrated circuit 110 and a host device 120 (e.g., a personal computer, such as a laptop) that will connect to the integrated circuit 110 to send and receive data, such as data to facilitate debugging of software (e.g., firmware) that will be executed by the integrated circuit 110. The host device 120 includes integrated development environment (IDE) software 130 (e.g., Eclipse) that runs on the host device 120. The may host device 120 be configured to access (e.g., using the integrated development environment software 130) the integrated circuit 110 via a probe (e.g., a JTAG compliant probe) that connects the host device 120 to the integrated circuit 110. In some implementations (not shown in FIG. 1), the host device may connect directly to the integrated circuit 110 (e.g., via a passive cable including conductors corresponding the conductors of a debug interface of the integrated circuit 110.

Figure 2:
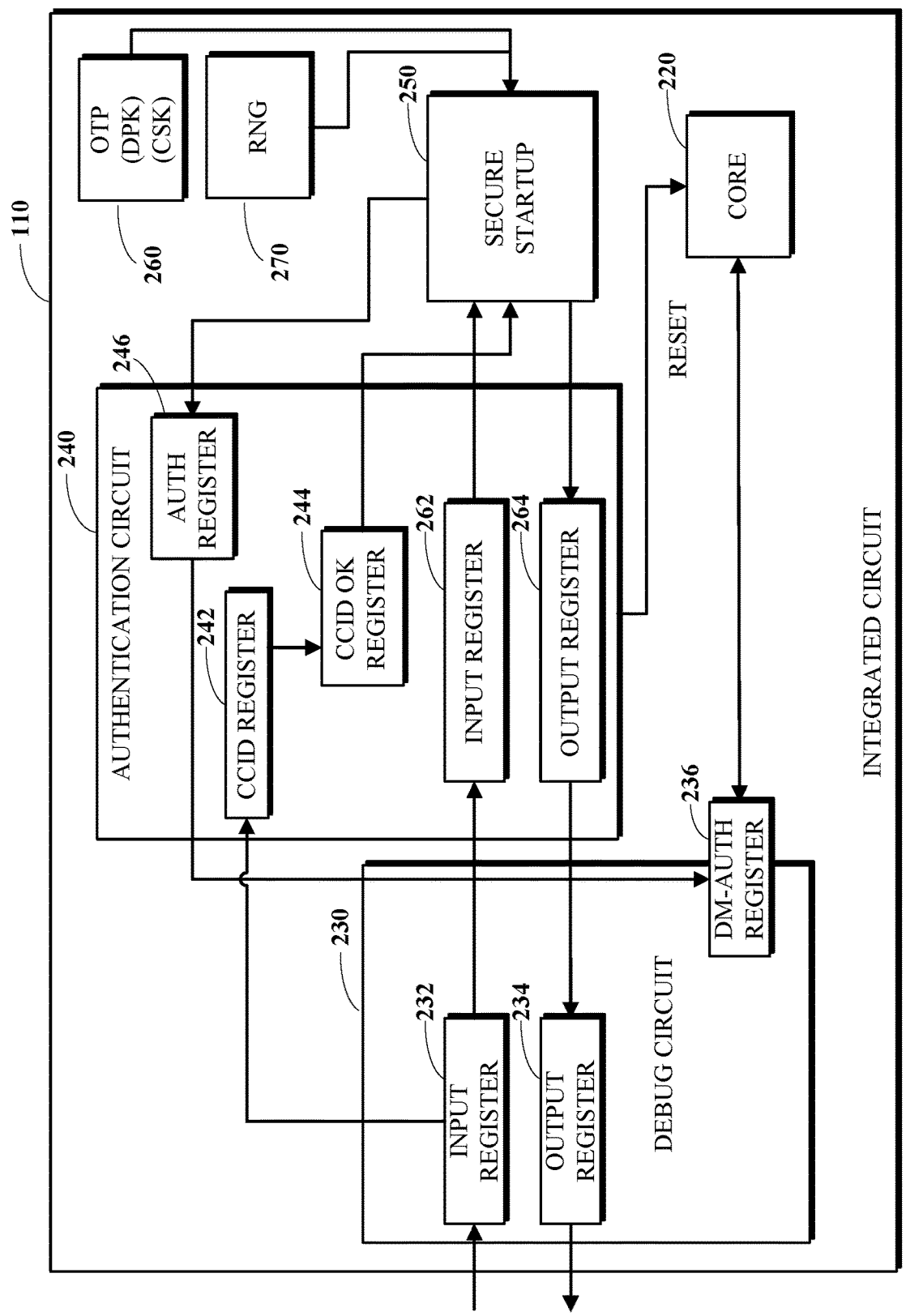
FIG. 2 is a block diagram of an example of an integrated circuit for executing instructions that includes a debug circuit and an authentication circuit configured to control access to the integrated circuit via the debug circuit.

FIG. 2 is a block diagram of an example of an integrated circuit 110 for executing instructions that includes a debug circuit 230 and an authentication circuit 240 configured to control access to the integrated circuit via the debug circuit 230. For example, the integrated circuit 110 may be a microprocessor, a microcontroller, or another integrated circuit configured to execute instructions. The integrated circuit 110 includes a processor core 220 (e.g., an IP core); a debug circuit 230; an authentication circuit 240; secure startup firmware 250 that may be executed by the processor core 220 and/or another processor core of the integrated circuit 110; a one-time-programmable (OTP) memory 260; and a random number generator (RNG) 270 (e.g., a true random number generator (TRNG) or a pseudorandom number generator (PRNG)). For example, the integrated circuit may be configured to implement the process 500 of FIG. 5.

The integrated circuit 110 includes a processor core 220 configured to execute instructions (e.g., RISC-V instructions, ARM instructions, or x86 instructions). In some implementations, although not shown in FIG. 2, the integrated circuit 110 includes multiple processor cores.

The integrated circuit 110 includes a debug circuit 230, which includes a debug interface comprising two or more conductors (e.g., conductors of a JTAG interface) with input/output drivers configured to, when enabled, transmit and receive signals between the processor core 220 and an external host device (e.g., the host device 120) via the two or more conductors. For example, the debug circuit 230 may be compliant with a standard, such as the RISC-V debug specification. The debug circuit 230 includes an input register 232 for receiving data via the debug interface and an output register 234 for transmitting data via the debug interface. The debug circuit 230 includes an authorization register 236 that can be used to enable or disable a connection between the debug circuit 230 and the processor core 220.

The integrated circuit 110 includes an authentication circuit 240 configured to control access to the processor core 220 via the debug interface of the debug circuit 230. For example, the authentication circuit 240 may coordinate with the secure startup firmware 250 to control access to the processor core 220 via the debug interface of the debug circuit 230. In some implementations, the authentication circuit 240 is configured to: compare an identifier received via the debug interface to an identifier of the integrated circuit 110 that is stored in non-volatile memory (e.g., the one-time programable memory 260) of the integrated circuit 110; and, responsive to the received identifier matching the identifier of the integrated circuit 110, updating a register 244 to indicate the match and cause the random number to be generated and transmitted. For example, the identifier received via the debug interface may be stored in the customer chip identifier (CCID) register 242 and the CCID OK register 244 may be updated based on comparison of the value in the CCID register 242 to the identifier of the integrated circuit 110 that is stored in non-volatile memory (e.g., the one-time programable memory 260) of the integrated circuit 110. For example, the authentication circuit 240 may be configured to trigger a reset of the processor core 220 after updating the CCID OK register 244. For example, upon reset, the connection between the debug circuit 230 and the processor core 220 may be kept disabled but not locked.

The integrated circuit 110 includes secure startup firmware 250 (e.g., the secure boot firmware of FIGS. 12-13) that may be executed by the processor core 220 and/or another processor core of the integrated circuit 110. For example, the secure startup firmware 250 may cause the integrated circuit to: check if the CCID OK register 244 is enabled; if the CCID OK register 244 is enabled, loop with the host device (e.g., the host device 120) for sending and/or receiving data; decrypt bytes received in the input register 262 (e.g., including memory-mapped shadow test access port (TAP) registers; check a signature (e.g., an ECDSA signature) of the decrypted data using a customer signing key (CSK) that is stored in one-time programable memory 260 and interpret the signed data; and if everything is ok, inform the authentication circuit 240 by updating the authenticated register 246 of the authentication circuit 240. In some implementations, responsive to checking the CCID OK register 244 and finding that the CCID OK register 244 is enabled, the secure startup firmware 250 uses the random number generator (RNG) 270 (e.g., a TRNG or a PRNG) to generate a random number to be used for encryption.

The authentication circuit 240 may in turn be configured to update the authorization register 236 of the debug circuit 230 based on the content of the authenticated register 246. Updating the authorization register 236 of the debug circuit 230 may enable or disable the connection between the debug circuit 230 and the processor core 220.

For example, the integrated circuit 110 may be configured to: receive a request from a host device (e.g., the host device 120) for access to the integrated circuit 110 via the debug interface; responsive to the request, generate a random number; transmit the random number from the integrated circuit 110 to the host device via the debug interface (e.g., via the output register 264 and the output register 234); receive, from the host device via the debug interface, input data that has been encrypted using the random number as a key; and decrypt the input data using the random number as a key. For example, the input data may include signed data (e.g., the signed data 342) that has been signed using a signing key (e.g., the signing key 332). For example, the input data may include debug commands for the processor core 220. For example, the input data may include a firmware image. The integrated circuit 110 may also be configured to send data to the host device that has been encrypted using the random number. For example, the integrated circuit 110 may be configured to encrypt output data using the random number as a key; and transmit the encrypted output data to the host device via the debug interface. In some implementations, the integrated circuit 110 is configured to encrypt the random number to obtain an encrypted random number; and transmit the encrypted random number to the host device via the debug interface. For example, the random number may be encrypted for transmission using a public key stored in the integrated circuit (e.g., a DPK stored in the OTP 260) that corresponds to a private key stored by the host device that can be used to decrypt the encrypted random number.

In some implementations, the authentication circuit 240 is configured to: compare a portion of the input data to a value stored in non-volatile memory (e.g., the one-time-programmable memory 260) of the integrated circuit 110; and, responsive to a match between the portion of the input data and the value, enable the debug interface to provide access to the processor core 220. For example, the value may be a part number or a serial number of the integrated circuit.

Figure 3A:
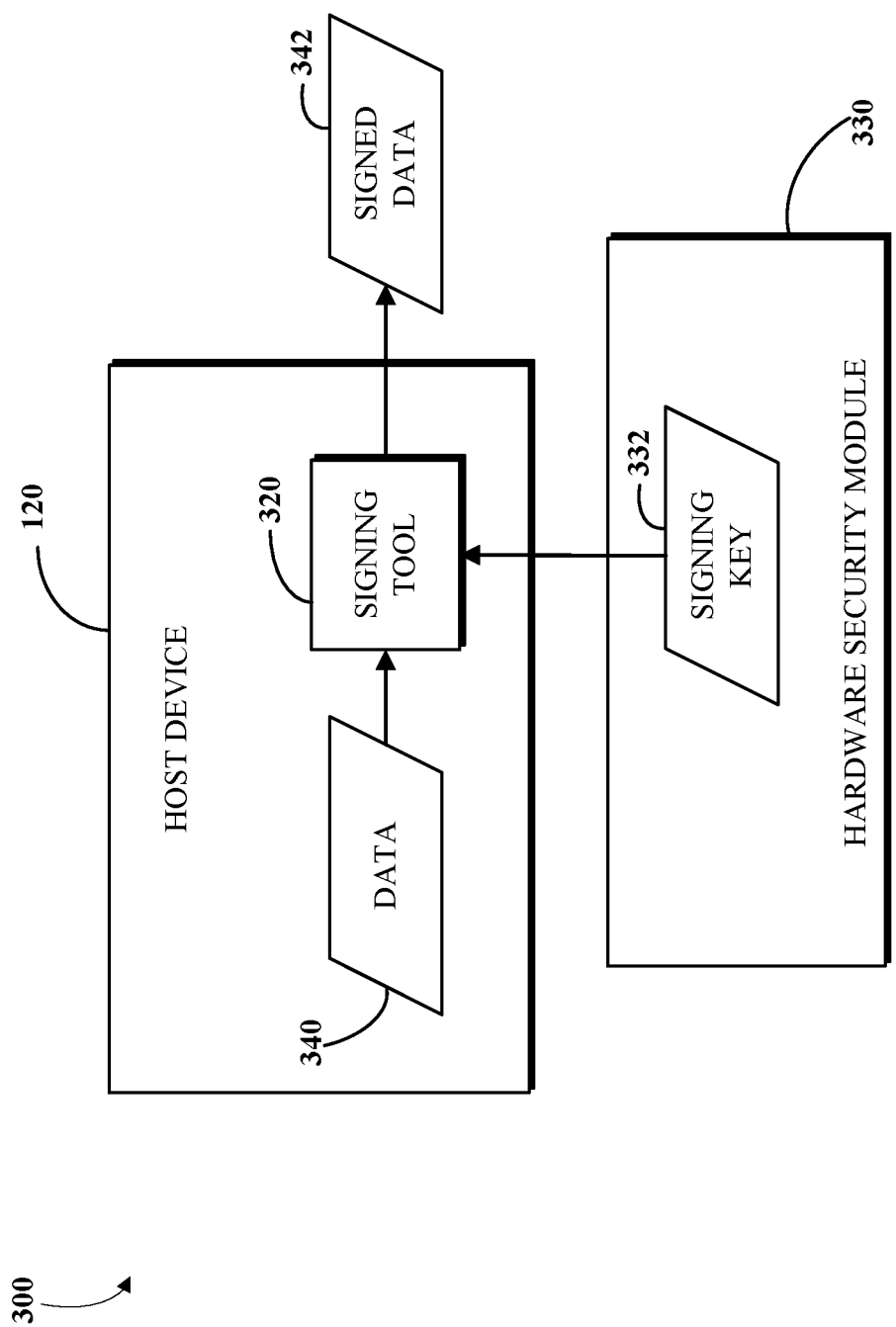
FIG. 3A is a block diagram of an example of a system for signing data.

FIG. 3A is a block diagram of an example of a system 300 for signing data. The system 300 includes the host device 120 and a hardware security module 330 that stores a signing key 332. The host device 120 includes a signing tool 320 that takes data 340 as input, and applies a digital signature using the signing key 332 to the data 340 to obtain signed data 342. For example, the signing key 332 may be a customer signing key (CSK).

Figure 3B:
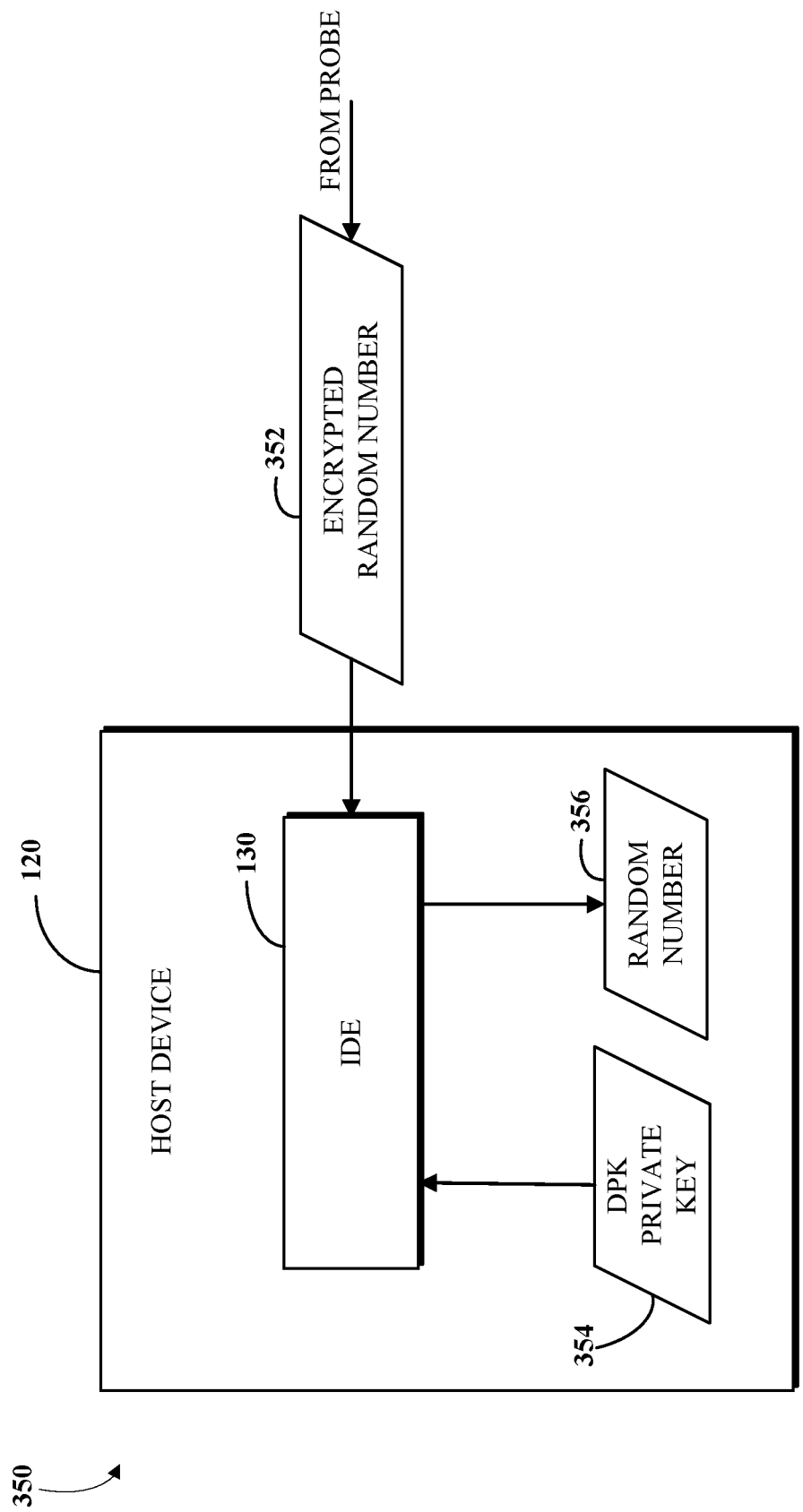
FIG. 3B is a block diagram of an example of a system for decrypting random number to be used as a key for encryption of a secure debug session.

FIG. 3B is a block diagram of an example of a system 350 for decrypting random number to be used as a key for encryption of a secure debug session. The system 350 includes the host device 120, which may be connected to a debug probe (e.g., a JTAG probe). The host device 120 includes the integrated development environment software 130, which may be configured to receive an encrypted random number 252 from an integrated circuit to be debugged via a debug interface and via a debug probe. For example, the integrated development environment software 130 may be configured to use a DPK private key 354 to decrypt the encrypted random number 352 received from the integrated circuit to obtain a random number 356, where the random number 356 was encrypted for transmission using a corresponding public key stored by the integrated circuit. The random number 356 may then be stored in a data store of the host device 120 for later use in encrypting and/or decrypting data transferred between the host device 120 and the integrated circuit. Some models of debug probes may have the capability to perform encryption and decryption operations. In some implementations (not shown in FIG. 3B), the DPK private key may be stored in a debug probe and the decryption and the encryption operations can take place within the debug probe, which may provide a better security.

Figure 3C:
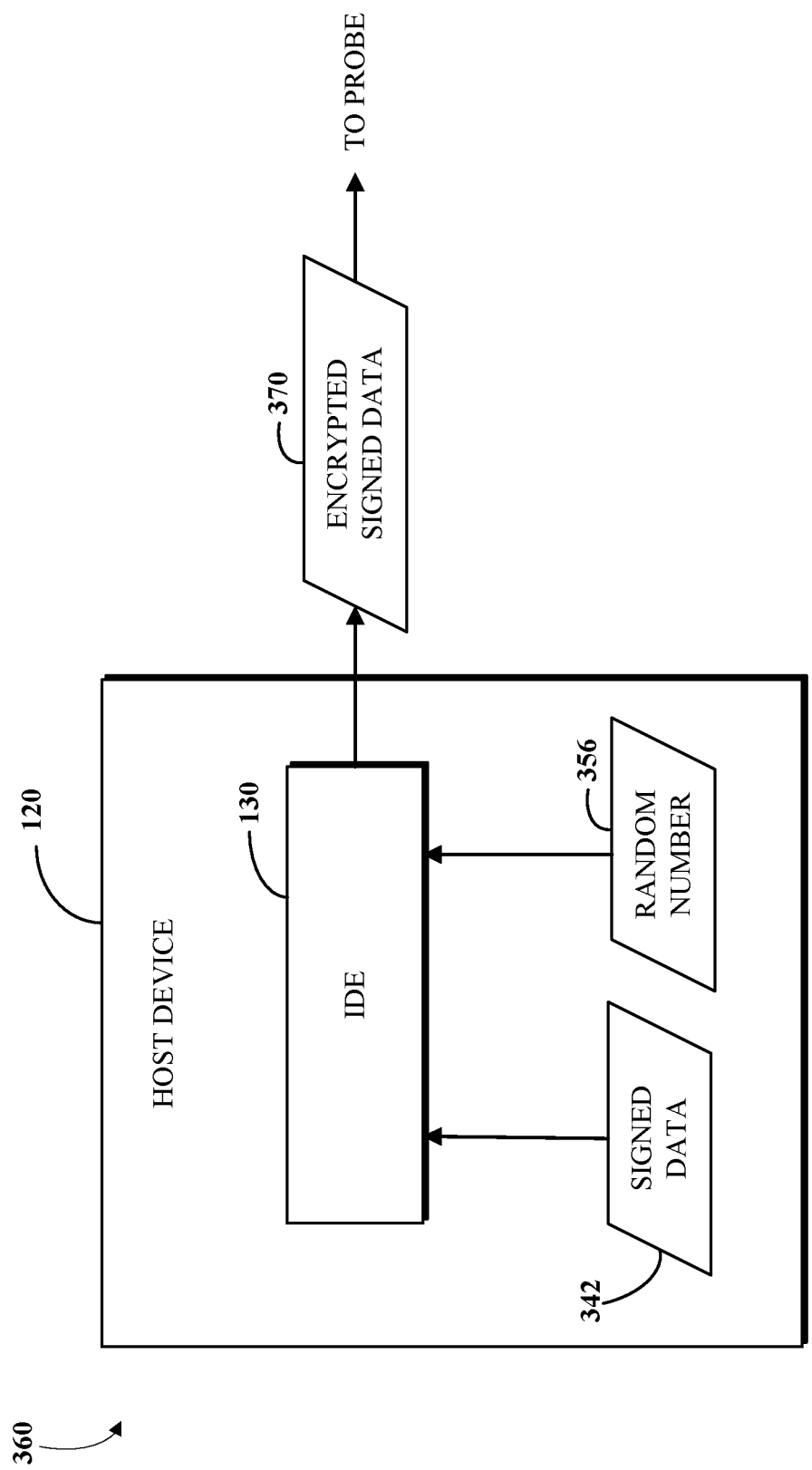
FIG. 3C is a block diagram of an example of a system for encrypting data.

FIG. 3C is a block diagram of an example of a system 360 for encrypting data. The system 350 includes the host device 120, which may be connected to a debug probe (e.g., a JTAG probe). The host device 120 includes the integrated development environment software 130, which may be configured to encrypt (e.g., applying an AES encryption algorithm) the signed data 342 using a random number 356 received from an integrated circuit via debug interface as a key to obtain encrypted signed data 370. The encrypted signed data 370 may be transmitted to the integrated circuit via a probe (e.g., a JTAG probe) and a debug interface of the integrated circuit.

Figure 4:
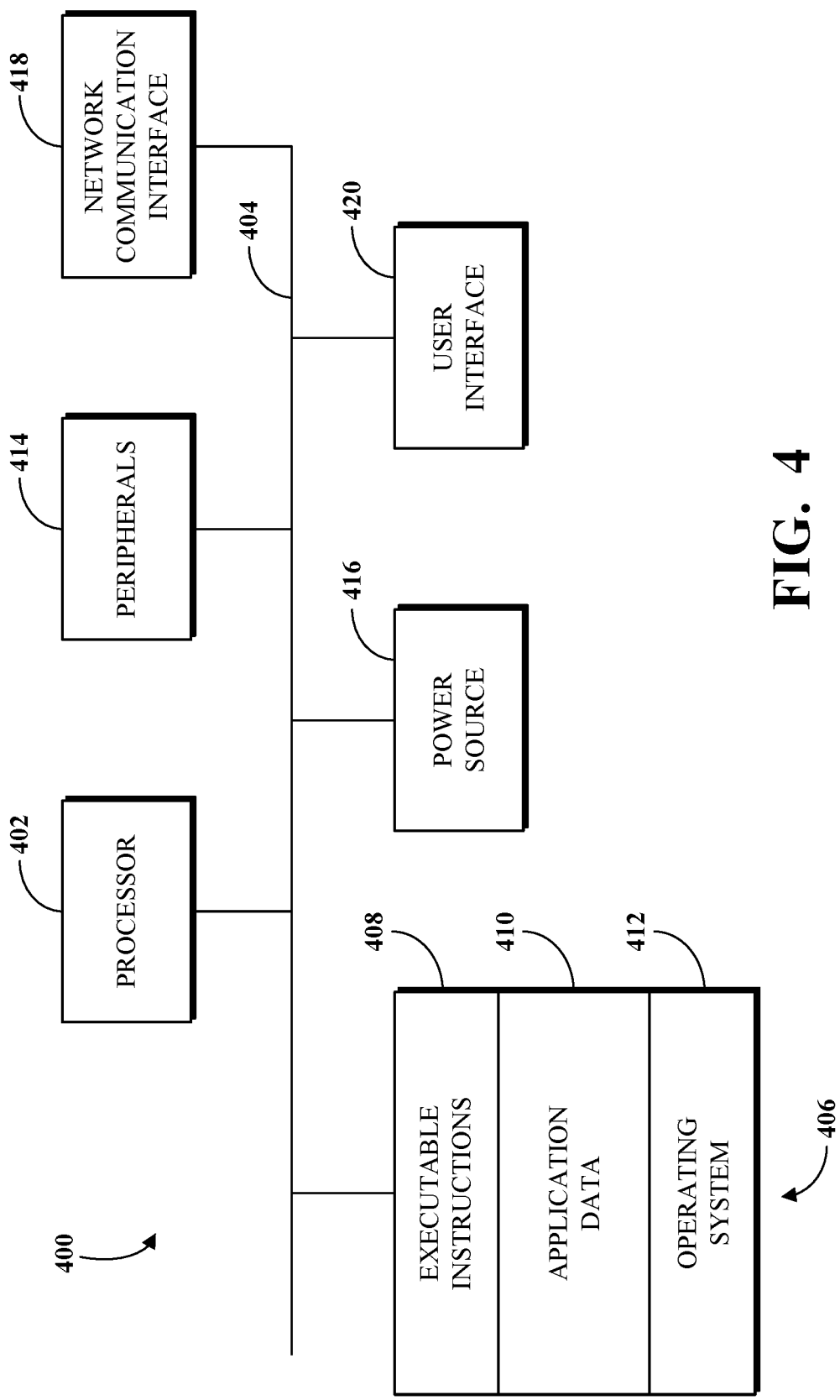
FIG. 4 is a block diagram of an example of a hardware configuration of a computing device.

FIG. 4 is a block diagram of an example of a hardware configuration of a computing device 400, which may be used to implement a host device (e.g., the host device 120 shown in FIG. 1). The computing device 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions.

The memory 406 can include volatile memory, non-volatile memory, or a combination thereof. For example, the memory 406 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a computing device 400 can include volatile memory, such as RAM, and persistent memory, such as a hard drive or other storage.

The memory 406 can include executable instructions 408, data, such as application data 410, an operating system 412, or a combination thereof, for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions of an integrated development environment software 130. For example, the executable instructions 408 can include instructions executable by the processor 402 to cause the computing device 400 to implement the process 800 of FIG. 8. The application data 410 can include, for example, user files, database catalogs or dictionaries, configuration information or functional programs, such as a web browser, a web server, a database server, or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. For example, the peripherals 414 can include a serial port configured to communicate with a debug probe (e.g., the probe 140). The peripherals 414 can include sensors or detectors, or devices containing any number of sensors or detectors, which can monitor the computing device 400 itself or the environment around the computing device 400. For example, a computing device 400 can contain a temperature sensor for measuring temperatures of components of the computing device 400, such as the processor 402. Other sensors or detectors can be used with the computing device 400, as can be contemplated. In some implementations, the power source 416 can be a battery, and the computing device 400 can operate independently of an external power distribution system. Any of the components of the computing device 400, such as the peripherals 414 or the power source 416, can communicate with the processor 402 via the bus 404.

The network communication interface 418 can also be coupled to the processor 402 via the bus 404. In some implementations, the network communication interface 418 can comprise one or more transceivers. The network communication interface 418 can, for example, provide a connection or link to a network via a network interface, which can be a wired network interface, such as Ethernet, or a wireless network interface. For example, the computing device 400 can communicate with other devices via the network communication interface 418 and the network interface using one or more network protocols, such as Ethernet, TCP, IP, power line communication (PLC), WiFi, infrared, GPRS, GSM, CDMA, or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the computing device 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

Figure 5:
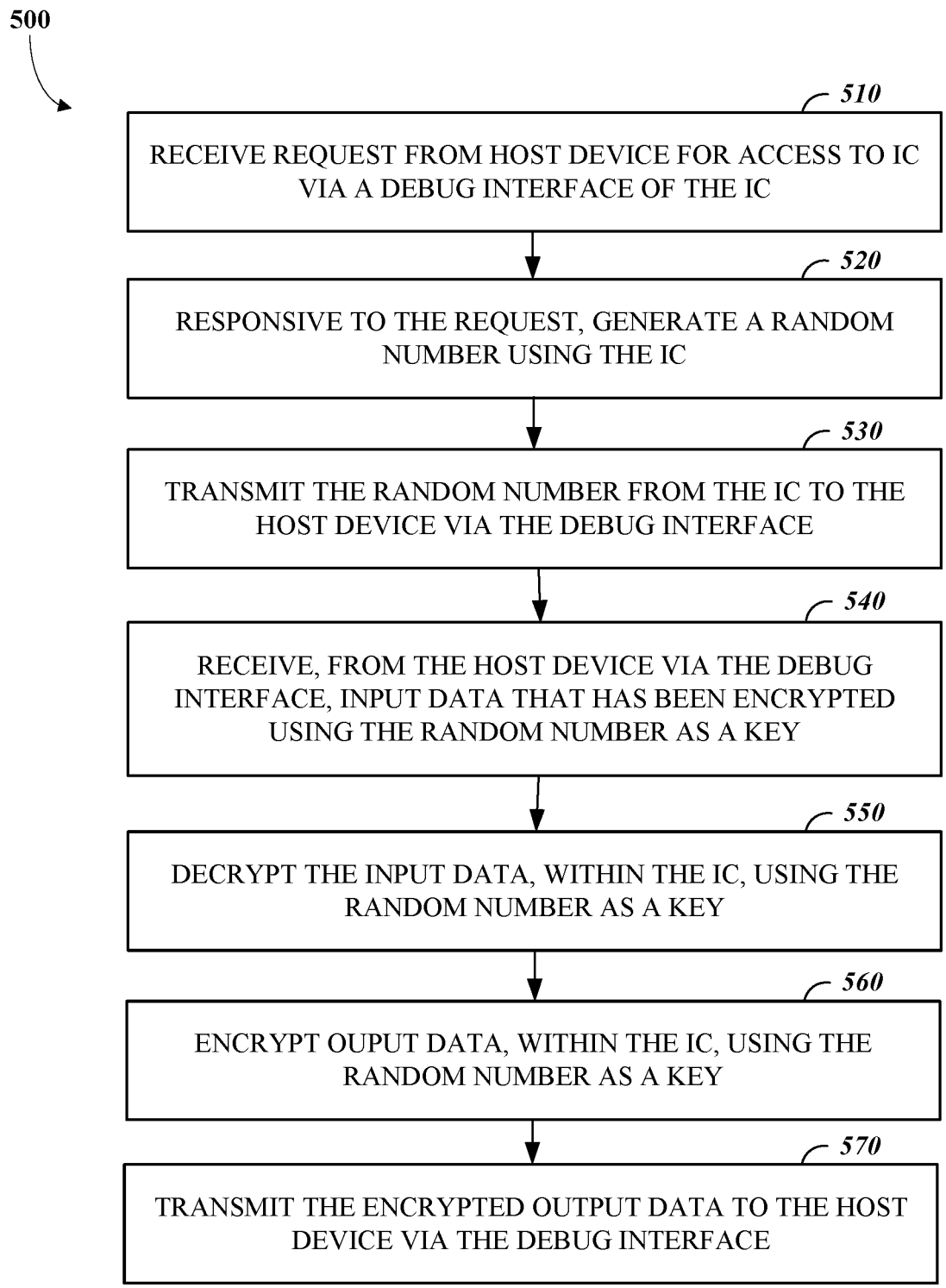
FIG. 5 is a flow chart of an example of a process for establishing secure communication with a host device using a debug interface of an integrated circuit for executing instructions.

FIG. 5 is a flow chart of an example of a process 500 for establishing secure communication with a host device using a debug interface of an integrated circuit for executing instructions. The process 500 includes receiving 510 a request from a host device for access to an integrated circuit via a debug interface of the integrated circuit; responsive to the request, generating 520 a random number using the integrated circuit; transmitting 530 the random number from the integrated circuit to the host device via the debug interface; receiving 540, from the host device via the debug interface, input data that has been encrypted using the random number as a key; decrypting 550 the input data, within the integrated circuit, using the random number as a key; encrypting 560 output data, within the integrated circuit, using the random number as a key; and transmitting 570 the encrypted output data to the host device via the debug interface. For example, the process 500 may be implemented using the integrated circuit 110 of FIG. 2.

The process 500 includes receiving 510 a request from a host device (e.g., the host device 120) for access to an integrated circuit (e.g., the integrated circuit 110) via a debug interface of the integrated circuit. In some implementations, the request is received 510 from the host device via a debug probe (e.g., the probe 140) connecting the host device to the debug interface of the integrated circuit. In some implementations, the request is received 510 directly from the host device over a cable. In some implementations the request is authenticated as an initial step in a two-step host authentication scheme for secure debug. For example, the request may include an identifier (e.g., a CCID), and the identifier may be checked against an identifier of the integrated circuit stored by the integrated circuit to validate the request. For example, the process 600 of FIG. 6 may be implemented to validate the request.

The process 500 includes, responsive to the request, generating 520 a random number using the integrated circuit. For example, the random number may be a 128-bit number. For example, the random number may be a 256-bit number. For example, the random number may be generated 520 using a hardware based random number generator (RNG) (e.g., a TRNG or a PRNG).

The process 500 includes, transmitting 530 the random number from the integrated circuit to the host device via the debug interface. In some implementations, the random number is encrypted by the integrated circuit for transmission to the host device. For example, the random number may be encrypted using a public key stored by the integrated circuit, and the host device may use a corresponding private key to decrypt the random number upon reception. For example, the process 700 of FIG. 7 may be implemented to transmit 530 the random number from the integrated circuit to the host device.

The process 500 includes receiving 540, from the host device via the debug interface, input data that has been encrypted using the random number as a key. The input data may be received 540 in electrical signals appearing on two or more conductors of the debug interface. In some implementations, the input data includes signed data that has been signed using a signing key. For example, the input data may include debug commands for a processor core (e.g., the processor core 220) of the integrated circuit. For example, the input data may include a firmware image including instructions for execution by the integrated circuit.

The process 500 includes decrypting 550 the input data, within the integrated circuit, using the random number as a key. For example, an Advanced Encryption System (AES) algorithm may be implemented to decrypt 550 the input data using the random number as a key.

The process 500 includes encrypting 560 output data, within the integrated circuit, using the random number as a key. For example, an Advanced Encryption System (AES) algorithm may be implemented to encrypt 560 the output data using the random number as a key.

The process 500 includes transmitting 570 the encrypted output data to the host device via the debug interface. The input data may be transmitted 570 in electrical signals appearing on two or more conductors of the debug interface. For example, the output data may include register values from a processor core (e.g., the processor core 220) of the integrated circuit.

Figure 6:
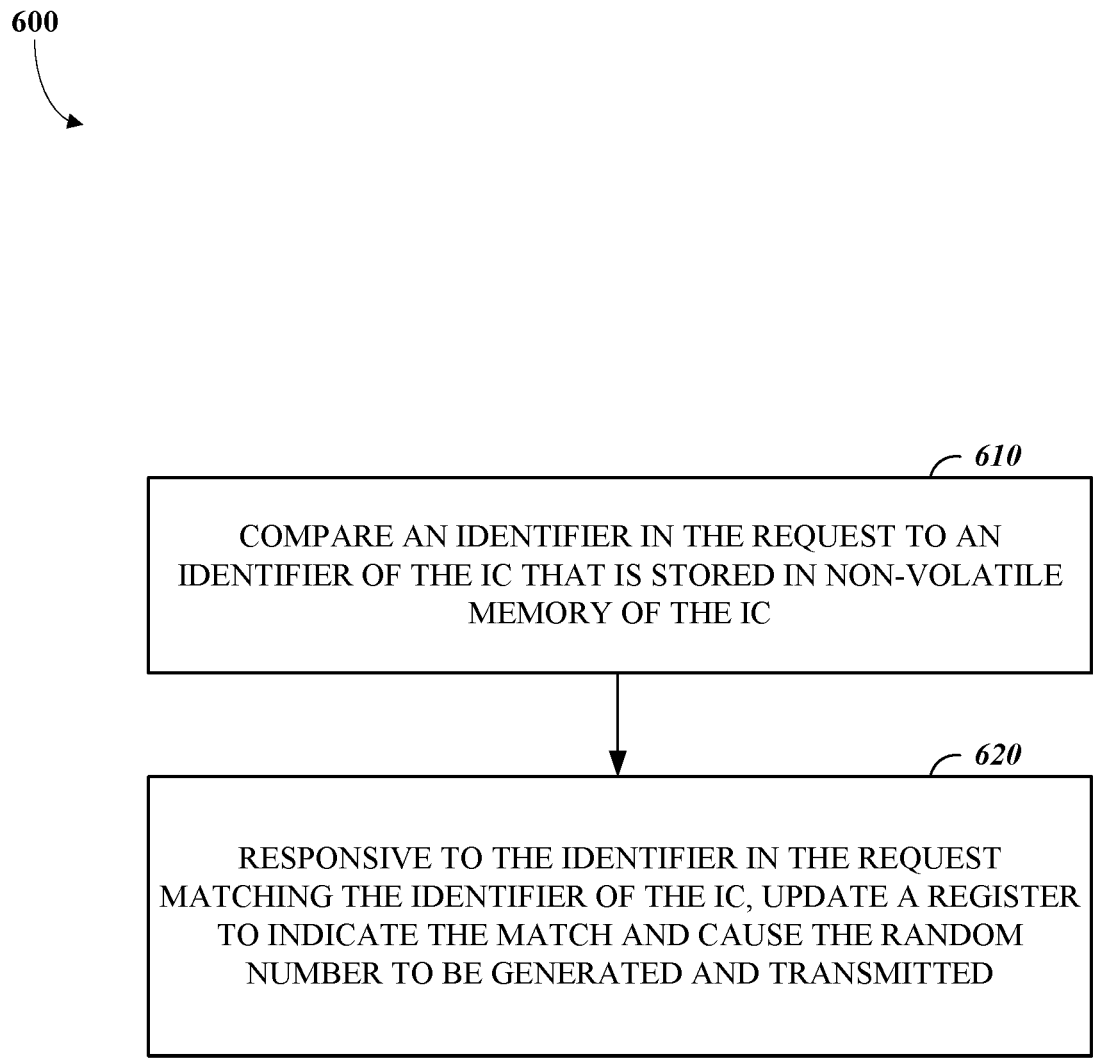
FIG. 6 is a flow chart of an example of a process for handling a request for access to an integrated circuit via a debug interface.

FIG. 6 is a flow chart of an example of a process 600 for handling a request for access to an integrated circuit (e.g., the integrated circuit 110) via a debug interface. The process 600 includes comparing 610 an identifier (e.g., a CCID) in the request to an identifier of the integrated circuit that is stored in non-volatile memory of the integrated circuit; and, responsive to the identifier in the request matching the identifier of the integrated circuit, updating 620 (e.g., setting) a register (e.g., the CCID OK register 244) to indicate the match and cause the random number to be generated 520 and transmitted 530. For example, the process 600 may be implemented using the integrated circuit 110 of FIG. 2.

Figure 7:
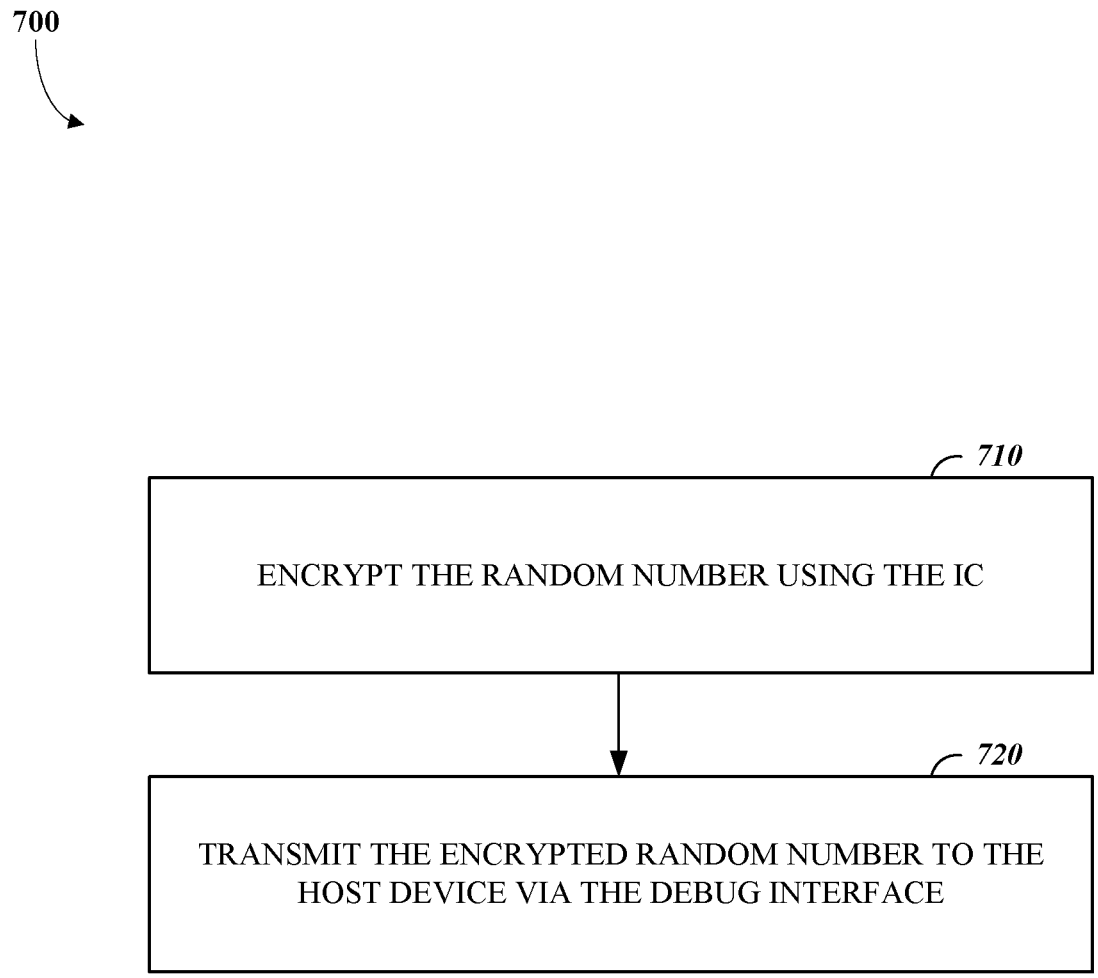
FIG. 7 is a flow chart of an example of a process for transmitting a random number from an integrated circuit to a host device via a debug interface.

FIG. 7 is a flow chart of an example of a process 700 for transmitting a random number from an integrated circuit (e.g., the integrated circuit 110) to a host device (e.g., the host device 120) via a debug interface. The process 700 includes encrypting 710 the random number using the integrated circuit to obtain an encrypted random number; and transmitting 720 the encrypted random number from the integrated circuit to the host device via the debug interface. In some implementations, the random number is encrypted 710 for transmission using a public key stored in the integrated circuit that corresponds to a private key stored by the host device that can be used to decrypt the encrypted random number. For example, the process 700 may be implemented using the integrated circuit 110 of FIG. 2.

Figure 8:
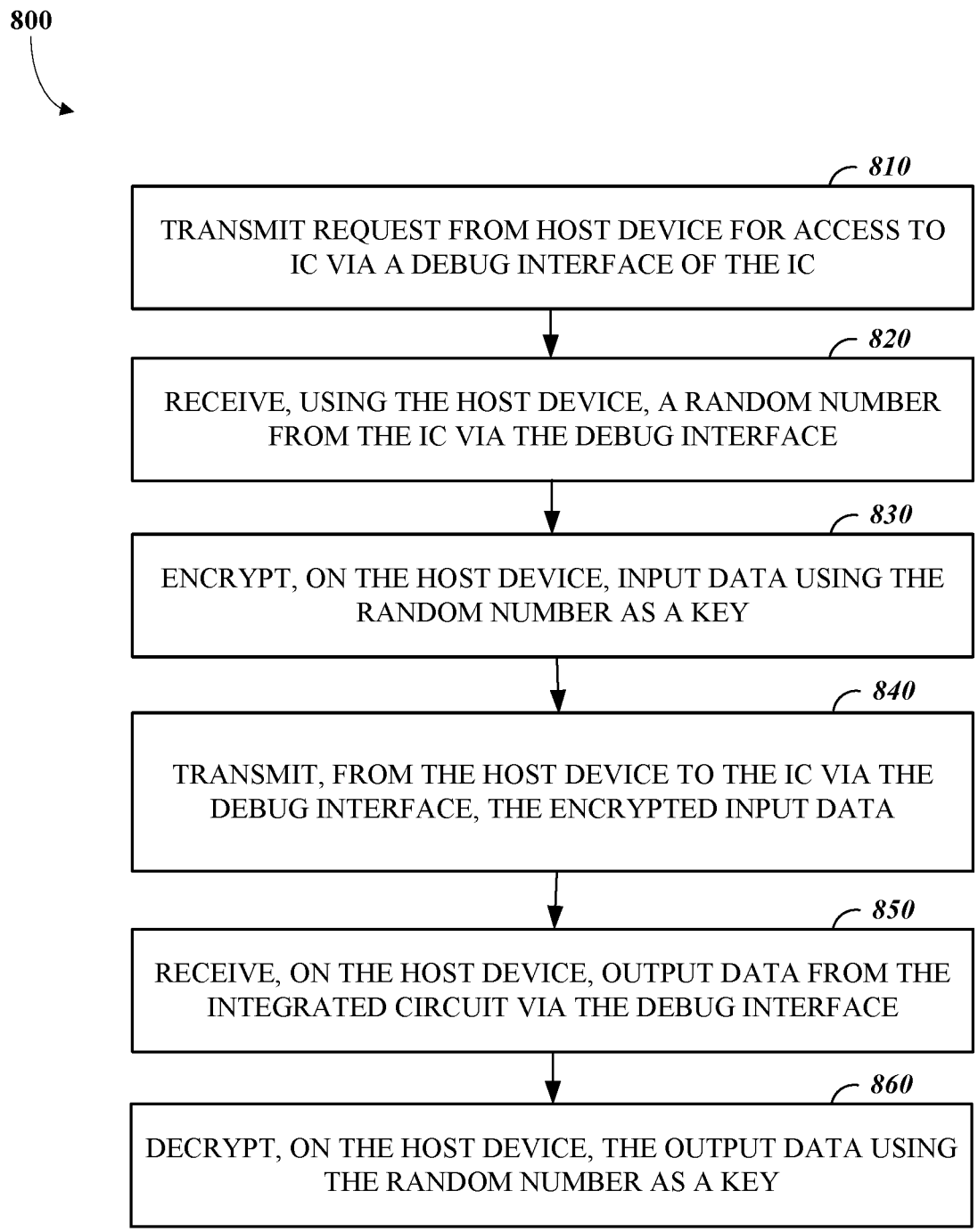
FIG. 8 is a flow chart of an example of a process for establishing secure communication with an integrated circuit using a debug interface.

FIG. 8 is a flow chart of an example of a process 800 for establishing secure communication with an integrated circuit using a debug interface. The process 800 includes transmitting 810 a request from a host device (e.g., the host device 120) for access to an integrated circuit (e.g., the integrated circuit 110) via a debug interface of the integrated circuit; receiving 820, using the host device, a random number from the integrated circuit via the debug interface; encrypting 830, on the host device, input data using the random number as a key; transmitting 840 from the host device to integrated circuit via the debug interface the encrypted input data; receiving 850, on the host device, output data from the integrated circuit via the debug interface; and decrypting 860, on the host device, the output data using the random number as a key. For example, the process 800 may be implemented using the host device 120 of FIG. 1. For example, the process 800 may be implemented using a host device including the computing device 400 of FIG. 4.

The process 800 includes transmitting 810 a request from a host device (e.g., the host device 120) for access to an integrated circuit (e.g., the integrated circuit 110) via a debug interface of the integrated circuit. In some implementations, the request is transmitted 810 via a debug probe (e.g., the probe 140) connecting the host device to the debug interface of the integrated circuit. In some implementations, the request is transmitted 810 directly from the host device to the integrated circuit over a cable. In some implementations the request is authenticated as an initial step in a two-step host authentication scheme for secure debug. For example, the request may include an identifier (e.g., a CCID), and the identifier may be checked against an identifier of the integrated circuit stored by the integrated circuit to validate the request. For example, the integrated circuit may implement the process 600 of FIG. 6 may be implemented to validate the request.

The process 800 includes receiving 820, using the host device, a random number from the integrated circuit via the debug interface. For example, the random number may be a 128-bit number. For example, the random number may be a 256-bit number. In some implementations, the random number is received 820 in an encrypted form and is decrypted using a private key of the host device after receipt. For example, the process 900 of FIG. 9 may be implemented to receive 820 the random number from the integrated circuit.

The process 800 includes encrypting 830, on the host device, input data using the random number as a key. For example, an Advanced Encryption System (AES) algorithm may be implemented to encrypt 830 the input data using the random number as a key.

The process 800 includes transmitting 840 from the host device to integrated circuit via the debug interface the encrypted input data. In some implementations, the input data includes signed data (e.g., the signed data 342) that has been signed using a signing key (e.g., the signing key 332). For example, the input data may include debug commands for a processor core (e.g., the processor core 220) of the integrated circuit. For example, the input data may include a firmware image including instructions for execution by the integrated circuit.

The process 800 includes receiving 850, on the host device, output data from the integrated circuit via the debug interface. For example, the output data may include register values from a processor core (e.g., the processor core 220) of the integrated circuit. The output data may have been encrypted by the integrated circuit using the random number as key.

The process 800 includes decrypting 860, on the host device, the output data using the random number as a key. For example, an Advanced Encryption System (AES) algorithm may be implemented to decrypt 860 the input data using the random number as a key.

In some implementations (not shown in FIG. 8), the process 800 is augmented to include signing data using a signing key (e.g., the signing key 332) to obtain signed data (e.g., the signed data 342). For example, the data may be signed as described in relation to FIG. 3A. For example, the input data may include the signed data.

Figure 9:
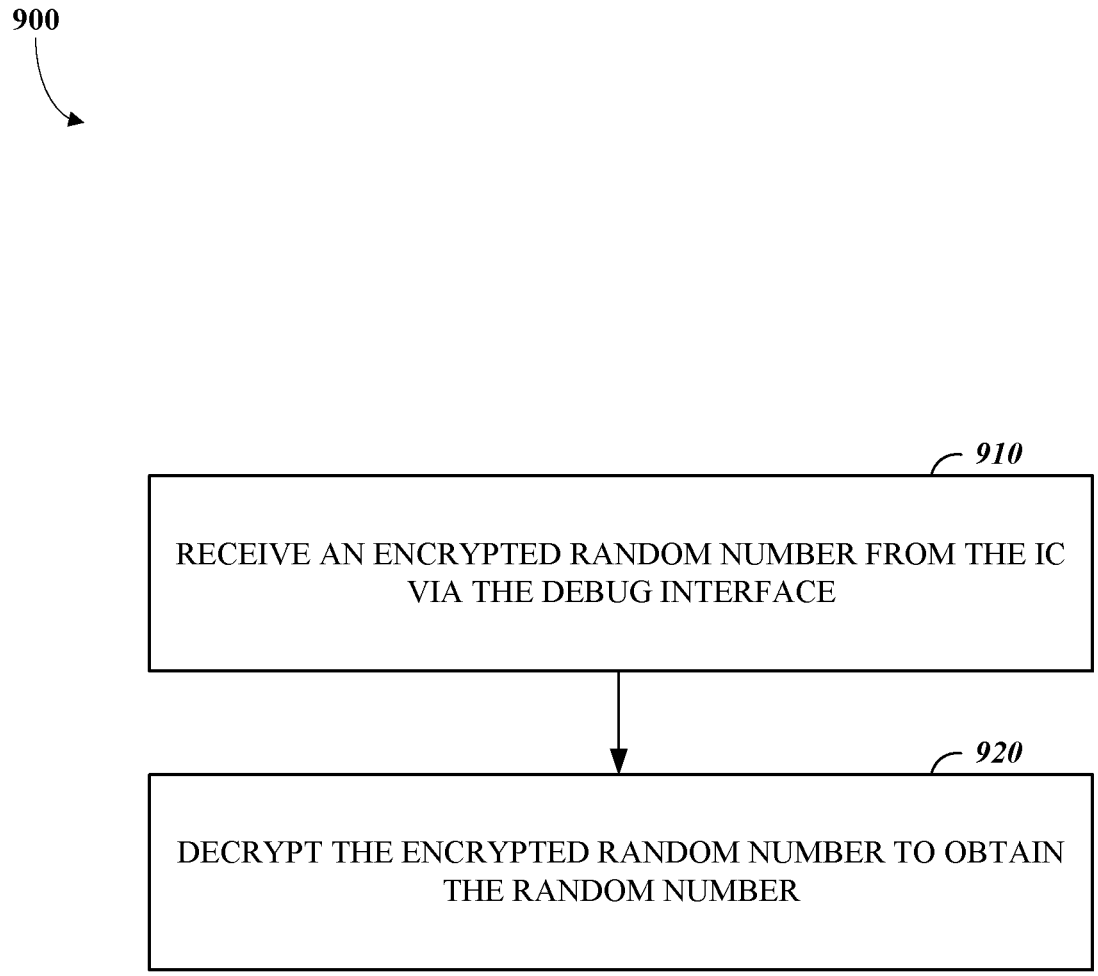
FIG. 9 is a flow chart of an example of a process for receiving, at a host device, a random number from an integrated circuit via a debug interface.

FIG. 9 is a flow chart of an example of a process 900 for receiving, at a host device, a random number from an integrated circuit via a debug interface. The process 900 includes receiving 910 an encrypted random number from the integrated circuit via the debug interface; and decrypting 920 the encrypted random number to obtain the random number. In some implementations, the encrypted random number is decrypted 920 using a private key stored in the host device that corresponds to a public key stored by the integrated circuit that was used to encrypt the random number. For example, the process 900 may be implemented using the host device 120 of FIG. 1. For example, the process 900 may be implemented using a host device including the computing device 400 of FIG. 4.

Figure 10:
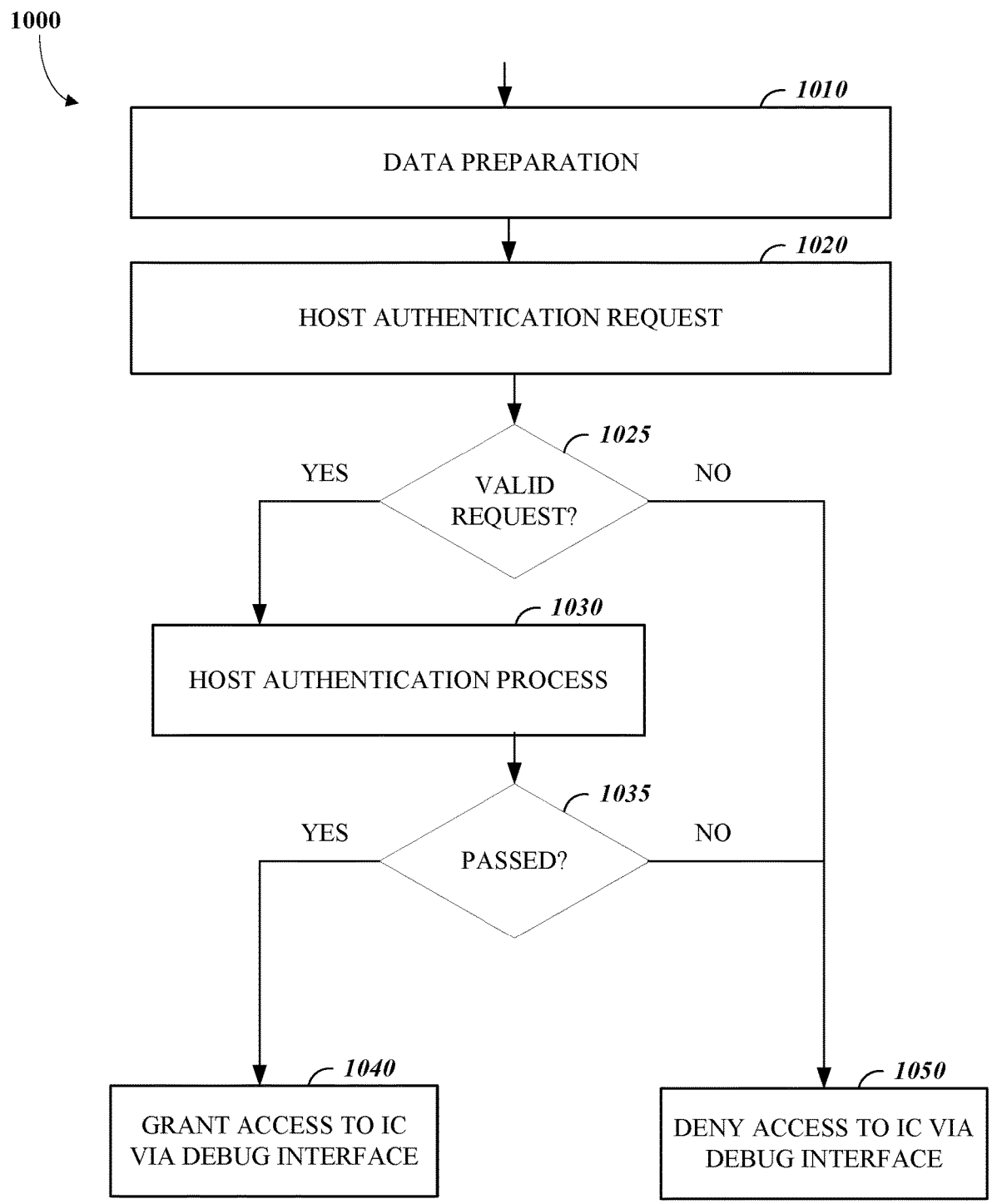
FIG. 10 is a flow chart of an example of a process for establishing secure communication between a host device an integrated circuit for executing instructions.

FIG. 10 is a flow chart of an example of a process 1000 for establishing secure communication between a host device an integrated circuit for executing instructions. The process 1000 may be used to implement a two-stage authentication. The process 1000 includes data preparation 1010; and performing 1020 a host authentication request (e.g., by implementing the process 1100 of FIG. 11) from the host device to the integrated circuit. If (at step 1025) the integrated circuit determines that the request is not valid (e.g., the CCID does not match), access to the integrated circuit via the debug interface is denied 1050. If (at step 1025) the integrated circuit determines that the request is valid, then perform 1030 a host authentication process request (e.g., by implementing the process 1200 of FIG. 12). If (at step 1035) the host authentication process is passed, then grant 1040 access to the integrated circuit via a debug interface. If (at step 1035) the host authentication process is not passed, then deny 1050 access to the integrated circuit via a debug interface.

Figure 11:
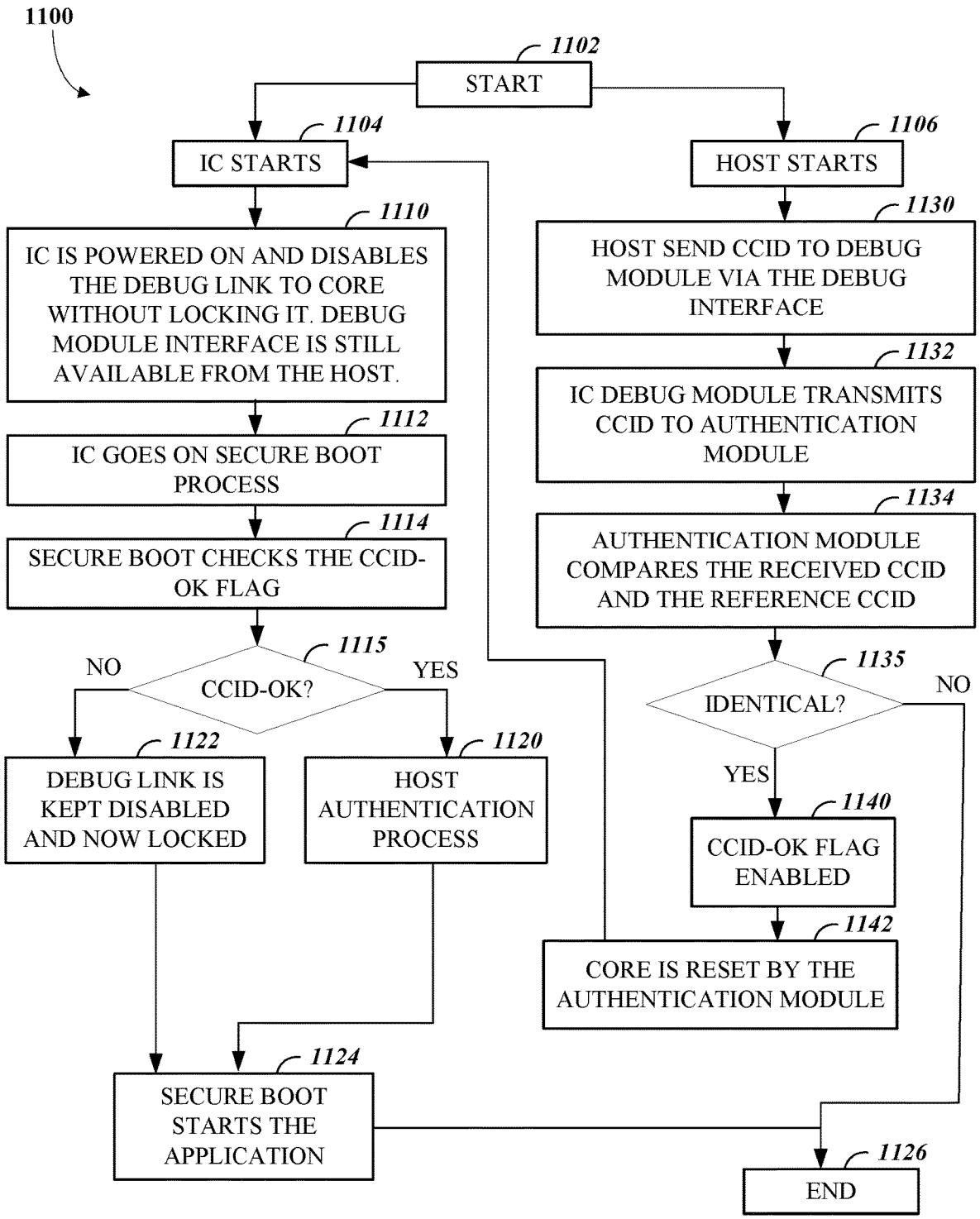
FIG. 11 is a flow chart of an example of a process for making and responding to a host authentication request.

FIG. 11 is a flow chart of an example of a process for making and responding to a host authentication request. The process 1100 includes starting 1102 by starting 1104 up the integrated circuit (e.g., a microprocessor chip) and starting 1106 up the host device. At step 1110, the integrated circuit is powered on and disables the debug link to a processor core without locking it, where a debug module interface is still available from the host. At step 1112, the integrated circuit may then execute a secure boot process. The secure boot process may check 1114 a CCID-OK flag. If (at step 1115) the CCID-Flag is not enabled, then (at step 1122) the debug link is kept disabled and now locked. At step 1124, the secure boot process starts an application running on the integrated circuit.

Meanwhile, at step 1130, the host sends a CCID to the debug module via the debug interface of the integrated circuit. At step 1132, the integrated circuit debug module transmits the CCID from the host device to an authentication module of the integrated circuit. At step 1134, the authentication module compares the received CCID with a reference CCID of the integrated circuit, which may have been stored in non-volatile memory. If (at step 1135) the two CCIDs do not match, then the process 1100 ends 1126.

If (at step 1135) the two CCIDs do match, then the CCID-OK flag in the authentication module is enabled 1140. At step 1142, the processor core of the integrated circuit is reset by the authentication module. This causes the integrated circuit to restart 1104 and the secure boot process to check 1114 the CCID-OK flag again. If (at step 1115) the CCID-OK flag is enabled (e.g., the flag is set to one), then (at step 1120) a host authentication process is performed (e.g., by implementing the process 1200 of FIG. 12). Depending on the outcome of a second level of authentication, the host authentication process of step 1120 may either enable (but not lock) the debug link, or it may keep the debug link disabled and lock the disable link. At step 1124, the secure boot process starts an application running on the integrated circuit, this time with the debug link enabled, and the process 1100 ends 1126.

Figure 12:
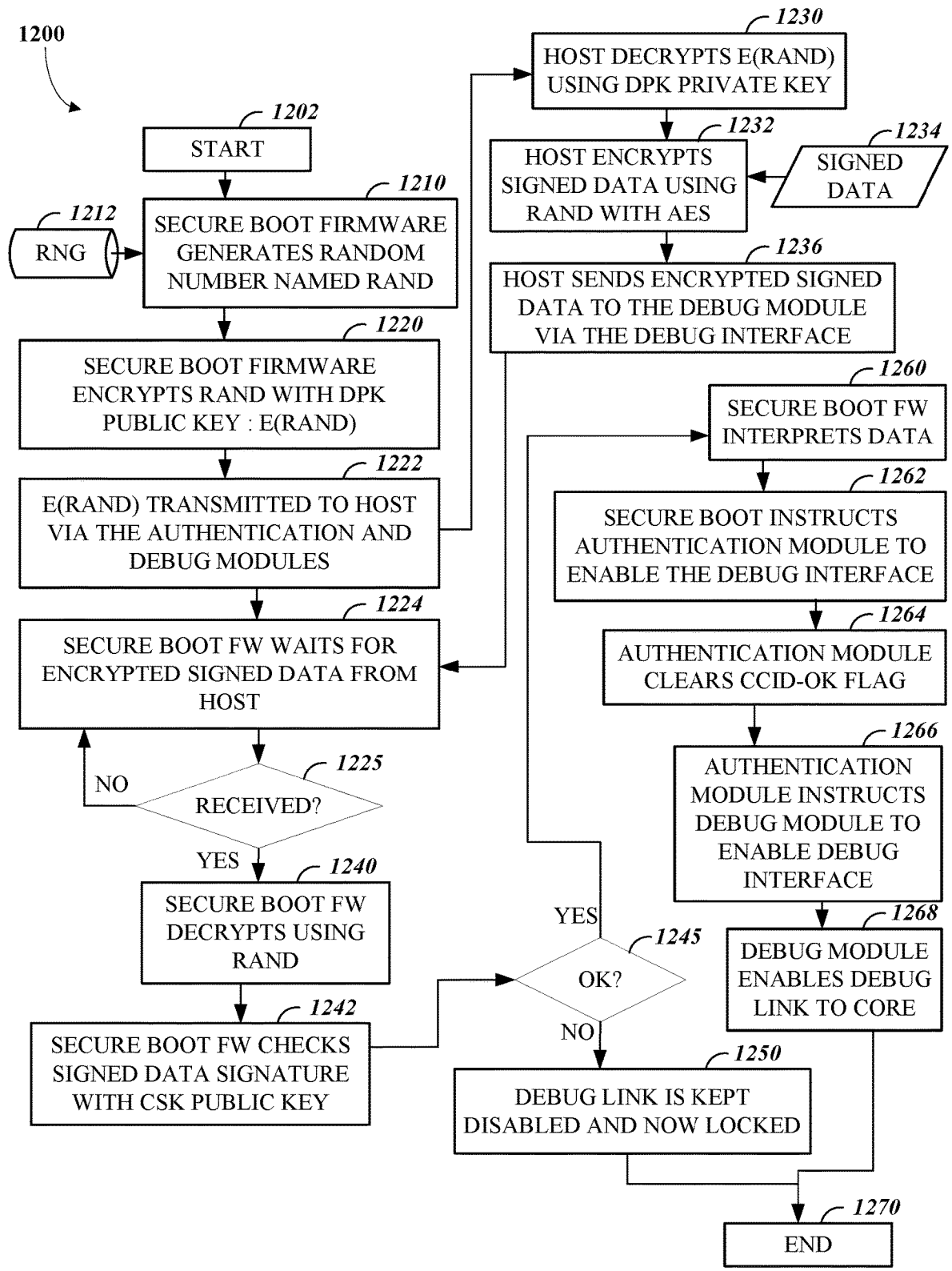
FIG. 12 is a flow chart of an example of a process for host authentication.

FIG. 12 is a flow chart of an example of a process 1200 for host authentication. When the process 1200 starts 1202, the secure boot firmware generates 1210 a random number, named RAND, (e.g., a 128-bit random number) using a random number generator (RNG) 1212 (e.g., a TRNG or a PRNG). At step 1220, the secure boot firmware encrypts RAND with a DPK public key to obtain an encrypted random number, E(RAND). For example, the random number may be encrypted using an algorithm such as RSA or ECIES. In some implementations a cryptographic hardware block may be used to encrypt the random number. At step 1222, the encrypted random number, E(RAND), is transmitted to the host device via the authentication and debug modules of the integrated circuit. At step 1224, the secure boot firmware waits encrypted signed data from the host device.

Upon receiving the encrypted random number, E(RAND), from the integrated circuit, the host device decrypts 1230 the encrypted random number using a DPK private key to recover the random number, RAND. At step 1232, the host device encrypts signed data 1234 using the random number, RAND, as an encryption key with an encryption algorithm (e.g., AES). At step 1236, the host device sends the encrypted signed data to the debug module via the debug interface of the integrated circuit.

When (at step 1225) the integrated circuit has received the encrypted signed data from the host device, then the secure boot firmware decrypts 1240 the encrypted signed data using the random number, RAND, as a key to obtain the signed data. At step 1242, the secure boot firmware checks the signed data signature with a CSK public key. In some implementations, a cryptographic hardware block is used to check the signature of the signed data. If (at step 1245) the signature does not check out, then, at step 1250, the debug link between the debug module and the processor core of the integrated circuit is disabled and now locked, and the process 1200 ends 1270.

If (at step 1245) the signature does check out, then the secure boot firmware interprets 1260 the data that was signed. For example, the data may include a part number of serial number. For example, the data may include a command for the integrated circuit. At step 1262, the secure boot firmware instructs the authentication module to enable the debug interface. The authentication module clears 1264 the CCID-OK flag, and the authentication module instructs 1266 the debug module to enable the debug interface. The debug module then enables 1268 the debug link to the processor core of the integrated circuit and the process 1200 ends 1270.

In a first aspect, the subject matter described in this specification can be embodied in an integrated circuit for executing instructions that includes a processor core configured to execute instructions; and a debug interface comprising two or more conductors with input/output drivers configured to, when enabled, transmit and receive signals between the processor core and an external host device via the two or more conductors; and wherein the integrated circuit is configured to: receive a request from a host device for access to the integrated circuit via the debug interface; responsive to the request, generate a random number; transmit the random number from the integrated circuit to the host device via the debug interface; receive, from the host device via the debug interface, input data that has been encrypted using the random number as a key; and decrypt the input data using the random number as a key. In the first aspect, the integrated circuit may include an authentication circuit configured to: compare an identifier received via the debug interface to an identifier of the integrated circuit that is stored in non-volatile memory of the integrated circuit; and, responsive to the received identifier matching the identifier of the integrated circuit, updating a register to indicate the match and cause the random number to be generated and transmitted. In the first aspect, the authentication circuit may be configured to: compare a portion of the input data to a value stored in non-volatile memory of the integrated circuit; and, responsive to a match between the portion of the input data and the value, enable the debug interface to provide access to the processor core. For example, the value may be a part number or a serial number of the integrated circuit. In the first aspect, the integrated circuit may be configured to: encrypt output data using the random number as a key; and transmit the encrypted output data to the host device via the debug interface. In the first aspect, the integrated circuit may be configured to: encrypt the random number to obtain an encrypted random number; and transmit the encrypted random number to the host device via the debug interface. For example, the random number may be encrypted for transmission using a public key stored in the integrated circuit that corresponds to a private key stored by the host device that can be used to decrypt the encrypted random number. In the first aspect, the input data may include signed data that has been signed using a signing key. In the first aspect, the input data may include debug commands for the processor core. In the first aspect, the input data may include a firmware image.

In a second aspect, the subject matter described in this specification can be embodied in methods that include receiving a request from a host device for access to an integrated circuit via a debug interface of the integrated circuit; responsive to the request, generating a random number using the integrated circuit; transmitting the random number from the integrated circuit to the host device via the debug interface; receiving, from the host device via the debug interface, input data that has been encrypted using the random number as a key; and decrypting the input data, within the integrated circuit, using the random number as a key. In the second aspect, the methods may include encrypting output data, within the integrated circuit, using the random number as a key; and transmitting the encrypted output data to the host device via the debug interface. In the second aspect, the request may be received from the host device via a debug probe connecting the host device to the debug interface of the integrated circuit. In the second aspect, transmitting the random number from the integrated circuit to the host device via the debug interface may include: encrypting the random number using the integrated circuit to obtain an encrypted random number; and transmitting the encrypted random number from the integrated circuit to the host device via the debug interface. For example, the random number may be encrypted for transmission using a public key stored in the integrated circuit that corresponds to a private key stored by the host device that can be used to decrypt the encrypted random number. In the second aspect, the input data may include signed data that has been signed using a signing key. In the second aspect, the methods may include comparing an identifier in the request to an identifier of the integrated circuit that is stored in non-volatile memory of the integrated circuit; and, responsive to the identifier in the request matching the identifier of the integrated circuit, updating a register to indicate the match and cause the random number to be generated and transmitted.

In a third aspect, the subject matter described in this specification can be embodied in methods that include transmitting a request from a host device for access to an integrated circuit via a debug interface of the integrated circuit; receiving, using the host device, a random number from the integrated circuit via the debug interface; encrypting, on the host device, input data using the random number as a key; and transmitting from the host device to integrated circuit via the debug interface the encrypted input data. In the third aspect, the methods may include receiving, on the host device, output data from the integrated circuit via the debug interface; and decrypting, on the host device, the output data using the random number as a key. In the third aspect, the request may be transmitted via a debug probe connecting the host device to the debug interface of the integrated circuit. In the third aspect, receiving the random number from the integrated circuit via the debug interface may include: receiving an encrypted random number from the integrated circuit via the debug interface; and decrypting the encrypted random number to obtain the random number. In the third aspect, the encrypted random number may be decrypted using a private key stored in the host device that corresponds to a public key stored by the integrated circuit that was used to encrypt the random number. In the third aspect, the methods may include signing data using a signing key to obtain signed data, in which the input data includes the signed data.

In a fourth aspect, the subject matter described in this specification can be embodied in systems that include a network interface; a memory; and a processor, wherein the memory includes instructions executable by the processor to cause the system to: transmit a request from a host device for access to an integrated circuit via a debug interface of the integrated circuit; receive, using the host device, a random number from the integrated circuit via the debug interface; encrypt, on the host device, input data using the random number as a key; and transmit from the host device to integrated circuit via the debug interface the encrypted input data. In the fourth aspect, the integrated circuit may be configured to receive, on the host device, output data from the integrated circuit via the debug interface; and decrypt, on the host device, the output data using the random number as a key. In the fourth aspect, the request may be transmitted via a debug probe connecting the host device to the debug interface of the integrated circuit. In the fourth aspect, receiving the random number from the integrated circuit via the debug interface may include: receiving an encrypted random number from the integrated circuit via the debug interface; and decrypting the encrypted random number to obtain the random number. In the fourth aspect, the encrypted random number may be decrypted using a private key stored in the host device that corresponds to a public key stored by the integrated circuit that was used to encrypt the random number. In the fourth aspect, the integrated circuit may be configured to sign data using a signing key to obtain signed data, in which the input data includes the signed data.

In a fifth aspect, the subject matter described in this specification can be embodied in a non-transitory computer-readable storage medium that includes instructions that, when executed by a processor, facilitate performance of operations comprising: transmitting a request from a host device for access to an integrated circuit via a debug interface of the integrated circuit; receiving, using the host device, a random number from the integrated circuit via the debug interface; encrypting, on the host device, input data using the random number as a key; and transmitting from the host device to integrated circuit via the debug interface the encrypted input data. In the fifth aspect, the operations may include receiving, on the host device, output data from the integrated circuit via the debug interface; and decrypting, on the host device, the output data using the random number as a key. In the fifth aspect, the request may be transmitted via a debug probe connecting the host device to the debug interface of the integrated circuit. In the fifth aspect, receiving the random number from the integrated circuit via the debug interface may include: receiving an encrypted random number from the integrated circuit via the debug interface; and decrypting the encrypted random number to obtain the random number. In the fifth aspect, the encrypted random number may be decrypted using a private key stored in the host device that corresponds to a public key stored by the integrated circuit that was used to encrypt the random number. In the fifth aspect, the operations may include signing data using a signing key to obtain signed data, in which the input data includes the signed data.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a processor core configured to execute instructions;
   a debug interface comprising two or more conductors with input/output drivers configured to, when enabled, transmit and receive signals between the processor core and an external host device via the two or more conductors, wherein the debug interface includes an authorization register that is updated to enable or disable the connection between the debug interface and the processor core;
   an authentication circuit comprising an authenticated register; and
   wherein the integrated circuit is configured to:
   receive a request from a host device for access to the integrated circuit via the debug interface;
   responsive to the request, generate a random number;
   transmit the random number from the integrated circuit to the host device via the debug interface;
   receive, from the host device via the debug interface, input data that has been encrypted using the random number as a key, wherein the input data includes at least one of a debug command and a firmware image;
   decrypt the input data using the random number as a key; and
   update content of the authenticated register based on comparison of the input data to a value stored in non-volatile memory of the integrated circuit, wherein the authentication circuit is configured to update content of the authorization register based on the content of the authenticated register.

2. The integrated circuit of claim 1, in which the authentication circuit is configured to:
   compare an identifier received via the debug interface to an identifier of the integrated circuit that is stored in non-volatile memory of the integrated circuit; and
   responsive to the received identifier matching the identifier of the integrated circuit, updating a register to indicate the match and cause the random number to be generated and transmitted.

3. The integrated circuit of claim 2, in which the authentication circuit is configured to:
   compare a portion of the input data to a value stored in non-volatile memory of the integrated circuit; and
   responsive to a match between the portion of the input data and the value, enable the debug interface to provide access to the processor core.

4. The integrated circuit of claim 3, in which the value is a part number or a serial number of the integrated circuit.

5. The integrated circuit of claim 1, in which the integrated circuit is configured to:
   encrypt output data using the random number as a key; and
   transmit the encrypted output data to the host device via the debug interface.

6. The integrated circuit of claim 1, in which the integrated circuit is configured to:
   encrypt the random number to obtain an encrypted random number; and
   transmit the encrypted random number to the host device via the debug interface.

7. The integrated circuit of claim 6, in which the random number is encrypted for transmission using a public key stored in the integrated circuit that corresponds to a private key stored by the host device that can be used to decrypt the encrypted random number.

8. The integrated circuit of claim 1, in which the input data includes signed data that has been signed using a signing key.

9. The integrated circuit of claim 1, in which the input data includes debug commands for the processor core.

10. The integrated circuit of claim 1, in which the input data includes a firmware image.

11. A method comprising:
    receiving a request from a host device for access to an integrated circuit via a debug interface of the integrated circuit;
    responsive to the request, generating a random number using the integrated circuit;
    transmitting the random number from the integrated circuit to the host device via the debug interface;
    receiving, from the host device via the debug interface, input data that has been encrypted using the random number as a key, wherein the input data includes at least one of a debug command and a firmware image;
    decrypting the input data, within the integrated circuit, using the random number as a key; and
    update content of an authenticated register in an authentication circuit based on comparison of the input data to a value stored in non-volatile memory of the integrated circuit, wherein the authentication circuit is configured to update content of an authorization register in the debug interface based on the content of the authenticated register.

12. The method of claim 11, comprising:
    encrypting output data, within the integrated circuit, using the random number as a key; and
    transmitting the encrypted output data to the host device via the debug interface.

13. The method of claim 11, in which the request is received from the host device via a debug probe connecting the host device to the debug interface of the integrated circuit.

14. The method of claim 11, in which transmitting the random number from the integrated circuit to the host device via the debug interface comprises:
  encrypting the random number using the integrated circuit to obtain an encrypted random number; and
  transmitting the encrypted random number from the integrated circuit to the host device via the debug interface.

15. The method of claim 14, in which the random number is encrypted for transmission using a public key stored in the integrated circuit that corresponds to a private key stored by the host device that can be used to decrypt the encrypted random number.

16. The method of claim 11, in which the input data includes signed data that has been signed using a signing key.

17. The method of claim 16, comprising:
  comparing an identifier in the request to an identifier of the integrated circuit that is stored in non-volatile memory of the integrated circuit; and
  responsive to the identifier in the request matching the identifier of the integrated circuit, updating a register to indicate the match and cause the random number to be generated and transmitted.

18. A method comprising:
  transmitting a request from a host device for access to an integrated circuit via a debug interface of the integrated circuit;
  receiving, using the host device, a random number from the integrated circuit via the debug interface;
  encrypting, on the host device, input data using the random number as a key, wherein the input data includes at least one of a debug command and a firmware image;
  signing data using a signing key to obtain signed data, in which the input data includes the signed data; and
  transmitting from the host device to the integrated circuit via the debug interface the encrypted input data.

19. The method of claim 18, comprising:
  receiving, on the host device, output data from the integrated circuit via the debug interface; and
  decrypting, on the host device, the output data using the random number as a key.

20. The method of claim 18, in which the request is transmitted via a debug probe connecting the host device to the debug interface of the integrated circuit.

21. The method of claim 18, in which receiving the random number from the integrated circuit via the debug interface comprises:
  receiving an encrypted random number from the integrated circuit via the debug interface; and
  decrypting the encrypted random number to obtain the random number.

22. The method of claim 21, in which the encrypted random number is decrypted using a private key stored in the host device that corresponds to a public key stored by the integrated circuit that was used to encrypt the random number.

23. The method of claim 18, wherein the signing key is an ECDSA (Elliptic Curve Digital Signature Algorithm) key.

* * * * *